United States Patent
Kobayashi

(10) Patent No.: US 11,161,505 B2
(45) Date of Patent: Nov. 2, 2021

(54) VEHICLE CONTROL DEVICE, VEHICLE CONTROL METHOD, AND NON-TRANSITORY COMPUTER-READABLE MEDIUM STORING A PROGRAM

(71) Applicant: HONDA MOTOR CO., LTD., Tokyo (JP)

(72) Inventor: Sachio Kobayashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 274 days.

(21) Appl. No.: 16/429,609

(22) Filed: Jun. 3, 2019

(65) Prior Publication Data

US 2019/0367023 A1 Dec. 5, 2019

(30) Foreign Application Priority Data

Jun. 4, 2018 (JP) .............................. JP2018-106607

(51) Int. Cl.
*B60W 30/10* (2006.01)
*G08G 1/16* (2006.01)

(52) U.S. Cl.
CPC ..... *B60W 30/10* (2013.01); *B60W 2554/4041* (2020.02); *B60W 2554/801* (2020.02); *G08G 1/167* (2013.01)

(58) Field of Classification Search
CPC ... B60W 2554/801; B60W 2554/4041; B60W 2552/53; B60W 2554/805; B60W 2420/42; B60W 30/09; B60W 30/10; B60W 30/12; G08G 1/167; G06K 9/00798; G06T 2207/30256; G06T 7/73
See application file for complete search history.

(56) References Cited

U.S. PATENT DOCUMENTS

2008/0004807 A1* 1/2008 Kimura ................. B60W 40/02
701/301
2017/0060136 A1 3/2017 Kobayashi

FOREIGN PATENT DOCUMENTS

| JP | 2010-170255 A |   | 8/2010 |   |
|---|---|---|---|---|
| JP | 2015161968 A | * | 9/2015 |   |
| JP | 2017-049771 A |   | 3/2017 |   |
| JP | 2019059363 A | * | 4/2019 | ........... G08G 1/0112 |

* cited by examiner

*Primary Examiner* — Robert T Nguyen
*Assistant Examiner* — Dylan M Katz
(74) *Attorney, Agent, or Firm* — Carrier Blackman & Associates, P.C.; Joseph P. Carrier; Jeffrey T. Gedeon

(57) ABSTRACT

A vehicle control device includes a control unit, which is a control unit that determines, on the basis of the positions of a plurality of other vehicles, whether or not the position of a host vehicle lane is being correctly detected by a detection unit, and controls the host vehicle by determining that the position of the host vehicle lane is being correctly detected by the detection unit, on the basis of another vehicle existing among the plurality of other vehicles, for which a first distance, which is a distance in a lane widthwise direction between the position of the host vehicle lane and a position corresponding to the position of the other vehicle, is less than a threshold value.

13 Claims, 8 Drawing Sheets

VEHICLE CONTROL DEVICE, VEHICLE CONTROL METHOD, AND NON-TRANSITORY COMPUTER-READABLE MEDIUM STORING A PROGRAM

CROSS-REFERENCE TO RELATED APPLICATION

This application is based upon and claims the benefit of priority from Japanese Patent Application No. 2018-106607 filed on Jun. 4, 2018, the contents of which are incorporated herein by reference.

BACKGROUND OF THE INVENTION

Field of the Invention

The present invention relates to a vehicle control device, a vehicle control method, and a non-transitory computer-readable medium storing a program.

Description of the Related Art

A lane boundary line detection device has been proposed, which detects lane boundary lines (lane markings) of a host vehicle lane that defines a travel lane in which a host vehicle travels, while taking into consideration the position of a preceding vehicle (see Japanese Laid-Open Patent Publication No. 2010-170255). By taking into consideration not only the lane boundary lines themselves, but also the position of the preceding vehicle, it is possible to improve the accuracy in detection of the lane boundary lines.

SUMMARY OF THE INVENTION

However, with the lane boundary line detection device disclosed in Japanese Laid-Open Patent Publication No. 2010-170255, there is a concern that the lane markings of the host vehicle lane cannot always be accurately detected. For example, in a situation in which the preceding vehicle is in the middle of making a lane change, it may be considered that the lane markings of the host vehicle lane cannot be accurately detected. If the lane markings of the host vehicle lane cannot be accurately detected, traveling of the host vehicle cannot be controlled in a suitable manner.

An object of the present invention is to provide a vehicle control device, a vehicle control method, and a non-transitory computer-readable medium storing a program, in which traveling of a host vehicle can be controlled in a more suitable manner.

A vehicle control device according to one aspect of the present invention comprises a detection unit configured to detect a position of a lane and a position of another vehicle on a basis of peripheral information, and a control unit configured to determine, on a basis of the positions of a plurality of the other vehicles, whether or not a position of a host vehicle lane, which is the lane in which a host vehicle is traveling, is being correctly detected by the detection unit, and to control the host vehicle by determining that the position of the host vehicle lane is being correctly detected by the detection unit, on a basis of another vehicle existing among the plurality of other vehicles, for which a first distance, which is a distance in a lane widthwise direction between the position of the host vehicle lane and a position corresponding to the position of the other vehicle, is less than a threshold value.

A vehicle control method according to another aspect of the present invention comprises a step of detecting a position of a lane and a position of another vehicle on a basis of peripheral information, and a step of controlling, which is a step of determining, on a basis of the positions of a plurality of the other vehicles, whether or not a position of a host vehicle lane, which is the lane in which a host vehicle is traveling, is being correctly detected, and controlling the host vehicle by determining that the position of the host vehicle lane is being correctly detected, on a basis of another vehicle existing among the plurality of other vehicles, for which a first distance, which is a distance in a lane widthwise direction between the position of the host vehicle lane and a position corresponding to the position of the other vehicle, is less than a threshold value.

A non-transitory computer-readable storage medium according to another aspect of the present invention stores a program, wherein the program serves to execute, in a computer, a step of detecting a position of a lane and a position of another vehicle on a basis of peripheral information, and a step of controlling, which is a step of determining, on a basis of the positions of a plurality of the other vehicles, whether or not a position of a host vehicle lane, which is the lane in which a host vehicle is traveling, is being correctly detected, and controlling the host vehicle by determining that the position of the host vehicle lane is being correctly detected, on a basis of another vehicle existing among the plurality of other vehicles, for which a first distance, which is a distance in a lane widthwise direction between the position of the host vehicle lane and a position corresponding to the position of the other vehicle, is less than a threshold value.

According to the present invention, it is possible to provide a vehicle control device, a vehicle control method, and a non-transitory computer-readable medium storing a program, in which traveling of a host vehicle can be controlled in a more suitable manner.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of a vehicle control device, a vehicle control method, and a non-transitory computer-readable medium storing a program according to the present invention will be presented and described in detail below with reference to the accompanying drawings.

Embodiment

Figure 1:
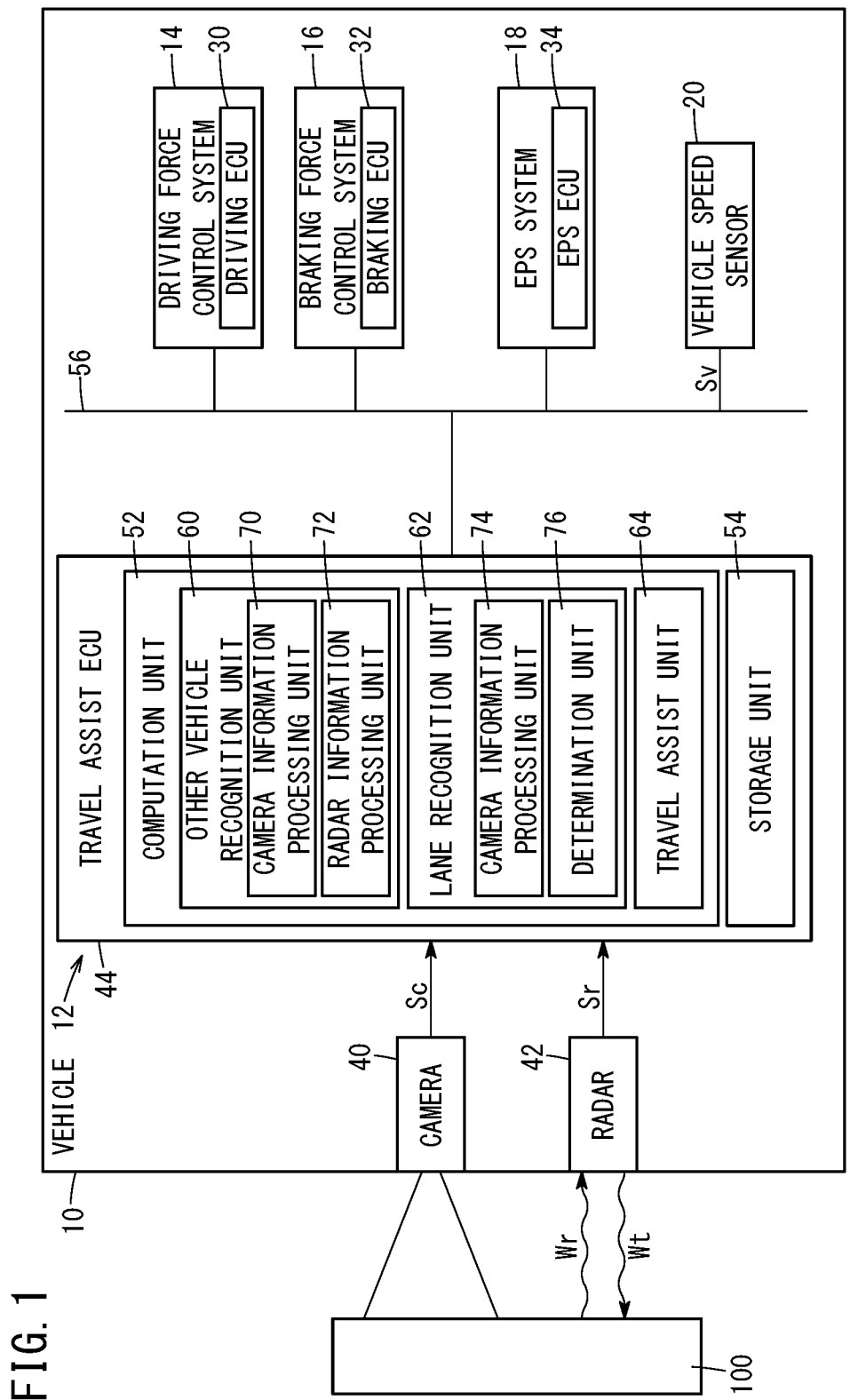
FIG. 1 is a block diagram showing a vehicle equipped with a vehicle control device according to an embodiment of the present invention.

A vehicle control device according to an embodiment of the present invention, a vehicle control method, and a non-transitory computer-readable medium storing a program will be described with reference to the drawings. FIG. 1 is a block diagram showing a vehicle equipped with a vehicle control device according to the present embodiment.

A vehicle (a host vehicle or driver's own vehicle) 10 is equipped with a travel assist system 12, a driving force control system 14, a braking force control system 16, an EPS system (electric power steering system) 18, and a vehicle speed sensor 20.

A travel assist ECU (travel assist electronic control device, vehicle control device) 44 is provided in the travel assist system 12.

The travel assist system 12 detects various peripheral objects (detected objects) 100 and lane markings 112 appearing around the periphery of the host vehicle 10. It should be noted that, when describing the lane markings in general, the reference numeral 112 is used, and when describing individual lane markings, the reference numerals 112L1, 112L2, 112R1, and 112R2 (see FIG. 2) are used. As the peripheral objects 100, for example, other vehicles 102, which are vehicles other than the host vehicle 10, may be cited. It should be noted that, when describing the other vehicles in general, the reference numeral 102 is used, and when describing particular instances of the other vehicles individually, the reference numerals 102a to 102e (see FIG. 2) are used. A preceding vehicle 102a is included among the other vehicles 102. The preceding vehicle 102a is a vehicle that is traveling immediately in front of the host vehicle 10. In the case that the preceding vehicle 102a has made a lane change, for example, a further preceding vehicle, which is another vehicle 102b that was traveling immediately in front of the preceding vehicle 102a, becomes the preceding vehicle. Further, pedestrians, walls, or the like, none of which are shown, may also be cited as peripheral objects 100. The travel assist system 12 assists traveling of the vehicle 10 depending on the peripheral objects 100 and the lane markings 112.

The driving force control system 14 is equipped with a driving ECU 30. The driving force control system 14 executes a driving force control for the vehicle 10. The driving ECU 30 controls the driving force of the vehicle 10 by controlling a non-illustrated engine or the like. In the driving force control carried out in the present embodiment, an automatic cruise control is included. The automatic cruise control serves to control traveling of the vehicle 10 in a manner so that the vehicle speed V coincides with a target vehicle speed.

The braking force control system 16 is equipped with a braking ECU 32. The braking force control system 16 executes a braking force control for the vehicle 10. The braking ECU 32 controls the braking force of the vehicle 10 by controlling a non-illustrated braking mechanism or the like.

The EPS system 18 is equipped with an EPS ECU 34. The EPS system 18 executes a steering assist control. The EPS ECU 34 assists the steering performed by the driver by controlling the constituent elements of an electric power steering device and the like. As the constituent elements of the electric power steering device, there may be cited a non-illustrated electric motor, a non-illustrated torque sensor, a non-illustrated steering angle sensor, and the like.

The vehicle speed sensor 20 detects the vehicle speed of the vehicle 10. The vehicle speed sensor 20 supplies vehicle speed information Sv, which is information indicating the vehicle speed, to the travel assist system 12, etc.

The travel assist system 12 is further equipped with a camera (image capturing unit) 40. Camera information Sc, which is information acquired by the camera 40, is supplied from the camera 40 to the driving assist ECU 44. Images (captured images) acquired by the camera 40 are included in the camera information Sc. The camera information Sc, together with later-described radar information Sr, makes up the peripheral information of the host vehicle 10. The detected objects 100 detected by the camera 40 are referred to as camera targets.

Although a single camera 40 is illustrated in FIG. 1, a plurality of cameras 40 may be provided. For example, a stereo camera may be configured by arranging two cameras 40 in a symmetrical fashion. The camera 40, for example, acquires images at 15 frames per second or faster. In the present embodiment, for example, images of 30 frames per second are acquired by the camera 40. The camera 40 may be a monochrome camera that acquires monochrome images, or may be a color camera that acquires color images. Further, the camera 40 may acquire images in a visible light range or may acquire images in an infrared range. The camera 40, for example, is disposed on a central part in a widthwise direction of the vehicle, on a front portion in the passenger compartment of the vehicle 10. More specifically, the camera 40 is disposed in the vicinity of a rearview mirror. Moreover, the camera 40 may be disposed on a central part in the widthwise direction on a front bumper of the vehicle 10.

The travel assist system 12 is equipped with a radar 42. The radar 42 emits transmitted waves Wt to the exterior of the vehicle 10, and receives reflected waves Wr which are reflected and returned from among the transmitted waves Wt by the detected objects 100. As the transmitted waves Wt, for example, electromagnetic waves, and more specifically millimeter waves or the like, are used. As described above, the detected objects 100 are the non-illustrated pedestrians and walls, the other vehicles 102, or the like. The radar 42 generates radar information (reflected wave signals) Sr based on the reflected waves Wr and the like. The radar 42 supplies the radar information Sr to the travel assist ECU 44. The detected objects 100 detected by the radar 42 are referred to as radar targets.

Although a single radar 42 is illustrated in FIG. 1, a plurality of radars 42 may be provided. The radar 42 is disposed, for example, on a front side of the vehicle 10. For example, the radar 42 is disposed on a front bumper, a front grille, or the like. The radar 42 may also be disposed on a rear side of the vehicle 10. For example, the radar 42 may be disposed on a rear bumper, a rear grille, or the like. Further, the radar 42 may be disposed on a side of the vehicle 10. For example, the radar 42 may be disposed on a side of the front bumper. The radar 42 is not limited to being a millimeter wave radar. For example, a laser radar, an ultrasonic sensor, or the like may be used as the radar 42.

The travel assist ECU 44 administers and is responsible for overall control of the travel assist system 12. A computation unit 52 and a storage unit 54 are provided in the travel assist ECU 44.

The camera information Sc and the radar information Sr are supplied to the travel assist ECU 44. The travel assist ECU 44 communicates via a communication line 56 with the driving ECU 30, the braking ECU 32, and the EPS ECU 34. The travel assist ECU 44 is equipped with a non-illustrated input/output unit. The input/output unit is equipped with a non-illustrated A/D converter for converting analog signals into digital signals.

The computation unit (computer) 52 is constituted, for example, by a CPU (Central Processing Unit). The computation unit 52 performs predetermined arithmetic processing using the camera information Sc, the radar information Sr, and the vehicle speed information Sv. Based on the results of such arithmetic processing, the computation unit 52 generates signals to be supplied to each of the driving ECU 30, the braking ECU 32, and the EPS ECU 34.

The computation unit 52 is equipped with an other vehicle recognition unit (detection unit) 60, a lane recognition unit (travel lane recognition unit, detection unit) 62, and a travel assist unit (control unit) 64. The other vehicle recognition unit 60, the lane recognition unit 62, and the travel assist unit 64 are realized by the computation unit 52 executing programs stored in the storage unit 54. The concerned programs need not necessarily be stored in the storage unit 54. For example, such programs may be supplied from the exterior via a non-illustrated wireless communication device. As examples of such a wireless communication device, there may be cited a mobile telephone, a smart phone, or the like.

The other vehicle recognition unit 60 is equipped with a camera information processing unit 70 and a radar information processing unit 72. The camera information processing unit 70 recognizes the other vehicles 102 on the basis of the camera information Sc. The camera information processing unit 70 recognizes the other vehicles 102 by performing pattern matching, for example. The radar information processing unit 72 recognizes the size, the relative velocity, etc., of the detected objects 100 including the other vehicles 102 on the basis of the radar information Sr. By combining the process performed by the camera information processing unit 70 and the process performed by the radar information processing unit 72, the positions, the types, etc., of the other vehicles 102 can be recognized. More specifically, the positions, the types, etc., of the other vehicles 102 can be recognized based on the camera targets and the radar targets. Although the positions of the other vehicles 102 may be any positions on the longitudinal center line of the other vehicles 102, the present embodiment is not limited to this feature. More specifically, although the positions of the other vehicles 102 can be the center positions of the rear ends of the other vehicles 102, the present embodiment is not limited to this feature.

The lane recognition unit 62 is equipped with a camera information processing unit 74 and a determination unit 76. The camera information processing unit 74 detects the lane markings 112 on the basis of the camera information Sc. The camera information processing unit 74 uses, for example, pattern matching when detecting the lane markings 112. The determination unit 76 determines the position of the host vehicle lane 110C, which is the travel lane in which the host vehicle 10 is traveling, on the basis of the lane markings 112, and information in relation to the other vehicles 102 acquired by the other vehicle recognition unit 60. It should be noted that, when describing the lanes in general, the reference numeral 110 is used, and when describing individual lanes, the reference numerals 110L1, 110C, and 110R1 (see FIG. 2) are used.

The travel assist unit 64 performs a travel assist for the vehicle 10, on the basis of the information (other vehicle information) of the other vehicles 102 supplied from the other vehicle recognition unit 60, and the information (lane information, travel lane information) of the lanes 110 recognized by the lane recognition unit 62. Such a travel assist includes, for example, at least one of a Lane Keeping Assistance System (LKAS) control and a Road Departure Mitigation (RDM) control.

The storage unit 54 is a non-transitory computer-readable medium and includes a non-illustrated random access memory (RAM) and a non-illustrated read only memory (ROM). The camera information Sc, the radar information Sr, and data to be provided to the various computation processes, etc., are stored, for example, in the RAM. Programs, tables, maps, and the like are stored, for example, in the ROM.

Figure 2:
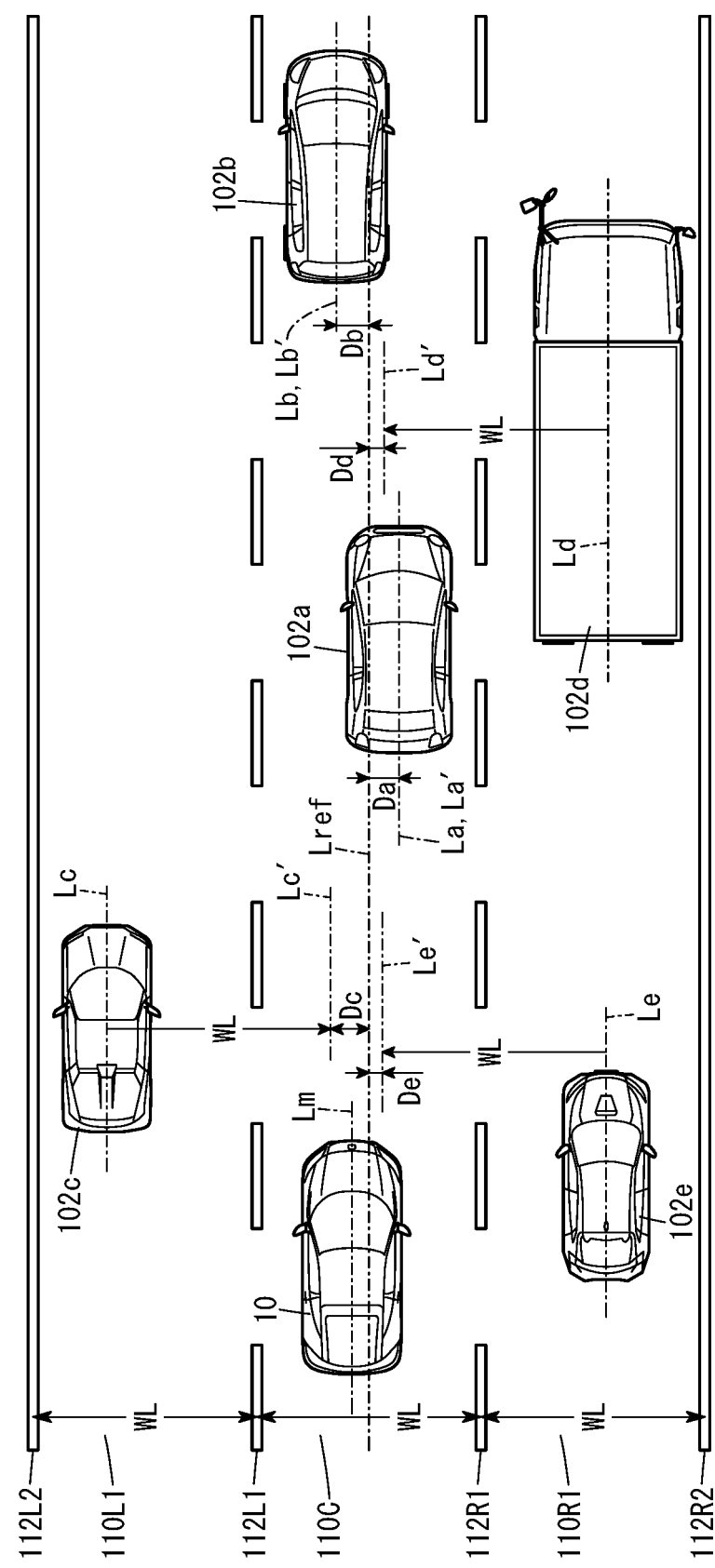
FIG. 2 is a view showing an example of a travel state.

FIG. 2 is a view showing an example of a travel state. In this instance, a case will be described as an example in which the host vehicle 10, another vehicle (a preceding vehicle) 102a, and another vehicle (a further preceding vehicle) 102b are traveling in the same lane 110C. Further, in this instance, a case will be described as an example in which another vehicle 102c is traveling in a lane (an adjacent lane) 110L1 adjacent to the host vehicle lane 110C on a left side thereof. Further, in this instance, a case will be described as an example in which other vehicles 102d and 102e are traveling in a lane (an adjacent lane) 110R1 adjacent to the host vehicle lane 110C on a right side thereof. Further, in this instance, a case will be described as an example in which the widths of the lanes 110, or stated otherwise the lane widths WL, are mutually equivalent.

The lane recognition unit 62 specifies the host vehicle lane 110C based on the lane markings 112L1 and 112R1 located on the left and right sides of the host vehicle 10. The lane recognition unit 62, on the basis of the lane markings 112L1 and 112R1, specifies a reference line Lref, which is positioned between the lane markings 112L1 and 112R1 located on the left and right sides of the host vehicle 10. The reference line Lref is a center line for which the distances from the lane markings 112L1 and 112R1 are mutually equivalent. In this instance, a case will be described as an example in which the position of the reference line Lref is the position of the host vehicle lane 110C. The lane recognition unit 62 may specify a plurality of reference positions that constitute the reference line Lref. Further, a line which is shifted a predetermined distance to the left or the right from the center line may be used as the reference line Lref.

The determination unit 76 determines whether or not first distances (deviations) D, which are distances between the position Lref of the host vehicle lane 110C and positions L' corresponding to the positions L of the other vehicles 102, are less than a threshold value. When describing the first distances in general, the reference character D is used, and when describing respective individual first distances, the reference characters Da to De are used. When describing the positions L of the other vehicles 102, the reference character L is used, and when describing respective individual positions of the other vehicles 102a to 102e, the reference characters La to Le are used. When describing the positions corresponding to the positions L of the other vehicles 102, the reference character L' is used, and when describing respective individual positions corresponding to the positions of the other vehicles 102a to 102e, the reference characters La' to Le' are used.

The positions L' corresponding to the positions L of the other vehicles 102 are positions at which the other vehicles 102 are shifted by a distance in the lane widthwise direction between the position Lref of the host vehicle lane 110C and the positions of the lanes 110 in which the other vehicles 102 are traveling. In this instance, a case will be described as an example in which the positions of the center lines, the distances of which from the lane markings 112 located on the left and right sides of the lanes 110 are equal to each other, are the positions of the lanes 110. The direction in which the positions L are shifted is a direction from the positions of the lanes 110 in which the other vehicles 102 are traveling toward the position Lref of the host vehicle lane 110C. As the positions L of the other vehicles 102, for example, portions of the travel trajectories of the other vehicles 102 are used. More specifically, for example, the travel trajectories of the other vehicles 102 within a predetermined time period are used as the positions L of the other vehicles 102. For example, average positions obtained from the travel trajectories of the other vehicles 102 within the predetermined time period are used as the positions L of the other vehicles 102. In the foregoing manner, the positions L' corresponding to the positions L of the other vehicles 102 are positions at which the positions L of the other vehicles 102 are shifted by an amount of shifting in accordance with the positions of the other vehicles 102. In the case that the travel trajectory Lm of the host vehicle 10 and the travel trajectories L of the other vehicles 102 are substantially parallel, the first distances D are less than the threshold value. The travel trajectory Lm of the host vehicle 10 can be a trajectory at any arbitrary position on the center line in the longitudinal direction of the host vehicle 10, but is not necessarily limited to this feature. The position of the host vehicle 10 can be a position at the center of the rear end of the host vehicle 10, but is not necessarily limited to this feature.

In the example shown in FIG. 2, the lane 110C in which the preceding vehicle 102a and the further preceding vehicle 102b are traveling is the same as the lane 110C in which the host vehicle 10 is traveling. In this case, the amount of shifting is 0, and the respective positions La' and Lb' corresponding to the positions La and Lb of the other vehicles 102a and 102b are the same as the respective positions La and Lb of the other vehicles 102a and 102b. It is determined by the determination unit 76 whether or not the first distance Da, which is the distance in the lane widthwise direction between the position Lref of the host vehicle lane 110C and the position La' corresponding to the position La of the preceding vehicle 102a, is less than the threshold value. The fact that the first distance Da is less than the threshold value implies that the preceding vehicle 102a is traveling in the host vehicle lane 110C on a travel trajectory that is substantially the same as the travel trajectory Lm of the host vehicle 10. Further, it is determined by the determination unit 76 whether or not the first distance Db, which is the distance in the lane widthwise direction between the position Lref of the host vehicle lane 110C and the position Lb' corresponding to the position Lb of the further preceding vehicle 102b, is less than the threshold value. The fact that the first distance Db is less than the threshold value implies that the further preceding vehicle 102b is traveling in the host vehicle lane 110C on a travel trajectory that is substantially the same as the travel trajectory Lm of the host vehicle 10.

Further, in the example shown in FIG. 2, the lane 110L1 in which the other vehicle 102c is traveling is adjacent to the left side of the host vehicle lane 110C. In this case, the amount of shifting is the lane width WL. The position Lc' corresponding to the position Lc of the other vehicle 102c is a position obtained by shifting the position Lc of the other vehicle 102c by the amount of the lane width WL. The direction in which the position Lc is shifted is a direction from the position of the lane 110L1 in which the other vehicle 102c is traveling toward the position Lref of the host vehicle lane 110C. It is determined by the determination unit 76 whether or not the first distance Dc, which is the distance in the lane widthwise direction between the position Lref of the host vehicle lane 110C and the position Lc' corresponding to the position Lc of the other vehicle 102c, is less than the threshold value. The fact that the first distance Dc is less than the threshold value implies that the other vehicle 102c is traveling in the adjacent lane 110L1 substantially in parallel with the host vehicle 10.

Further, in the example shown in FIG. 2, the lane 110R1 in which the other vehicles 102d and 102e are traveling is the lane 110R1 adjacent to the right side of the host vehicle lane 110C. In this case, the amount of shifting is the lane width WL. The respective positions Ld' and Le' corresponding to the positions Ld and Le of the other vehicles 102d and 102e are positions obtained by shifting the positions Ld and Le of the other vehicles 102d and 102e by the amount of the lane width WL. The direction in which the positions Ld and Le are shifted is a direction from the positions of the lane 110R1 in which the other vehicles 102d and 102e are traveling toward the position Lref of the host vehicle lane 110C. It is determined by the determination unit 76 whether or not the first distance Dd, which is the distance in the lane widthwise direction between the position Lref of the host vehicle lane 110C and the position Ld' corresponding to the position Ld of the other vehicle 102d, is less than the threshold value. The fact that the first distance Dd is less than the threshold value implies that the other vehicle 102d is traveling in the adjacent lane 110R1 substantially in parallel with the host vehicle 10. It is determined by the determination unit 76 whether or not the first distance De, which is the distance in the lane widthwise direction between the position Lref of the host vehicle lane 110C and the position Le' corresponding to the position Le of the other vehicle 102e, is less than the threshold value. The fact that the first distance De is less than the threshold value implies that the other vehicle 102e is traveling in the adjacent lane 110R1 substantially in parallel with the host vehicle 10.

In the case that the first distance Da between the position Lref of the host vehicle lane 110C and the position La' corresponding to the position La of the preceding vehicle 102a is less than the threshold value, the determination unit 76 performs the following process. More specifically, in such a case, the determination unit 76 determines that the position Lref of the host vehicle lane 110C is being correctly detected. In the case it is determined that the position Lref of the host vehicle lane 110C is being correctly detected by the lane recognition unit 62, the travel assist unit 64 performs the following process. More specifically, in such a case, the travel assist unit 64 carries out a control in a manner so that the host vehicle 10 travels in the lane 110C recognized by the lane recognition unit 62.

Figure 3:
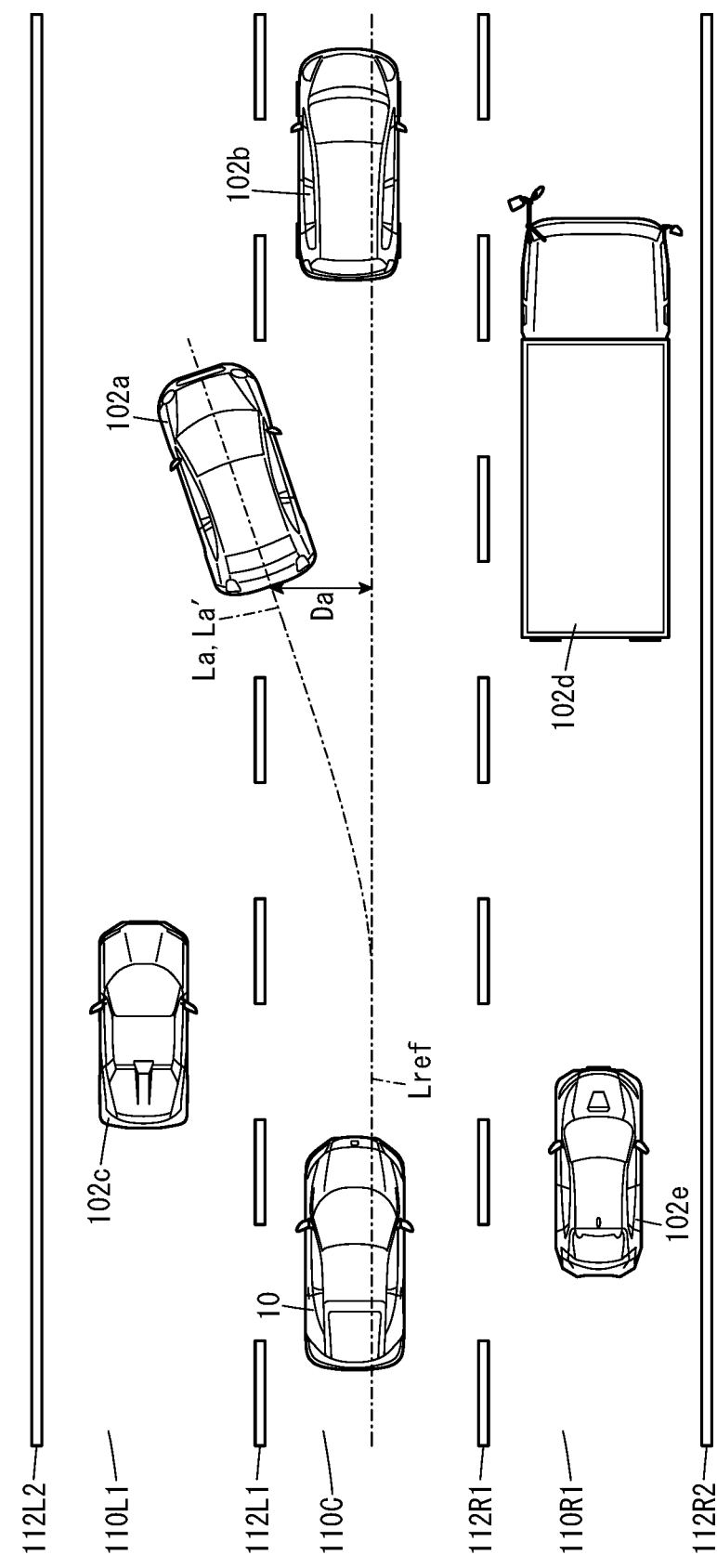
FIG. 3 is a diagram showing an example of a situation in which a preceding vehicle is in the middle of making a lane change.

FIG. 3 is a diagram showing an example of a situation in which a preceding vehicle is in the middle of making a lane change. In the case that the preceding vehicle 102a is in the middle of making a lane change, the first distance Da between the position Lref of the host vehicle lane 110C and the position La' corresponding to the position La of the preceding vehicle 102a is greater than or equal to the threshold value.

Figure 4:
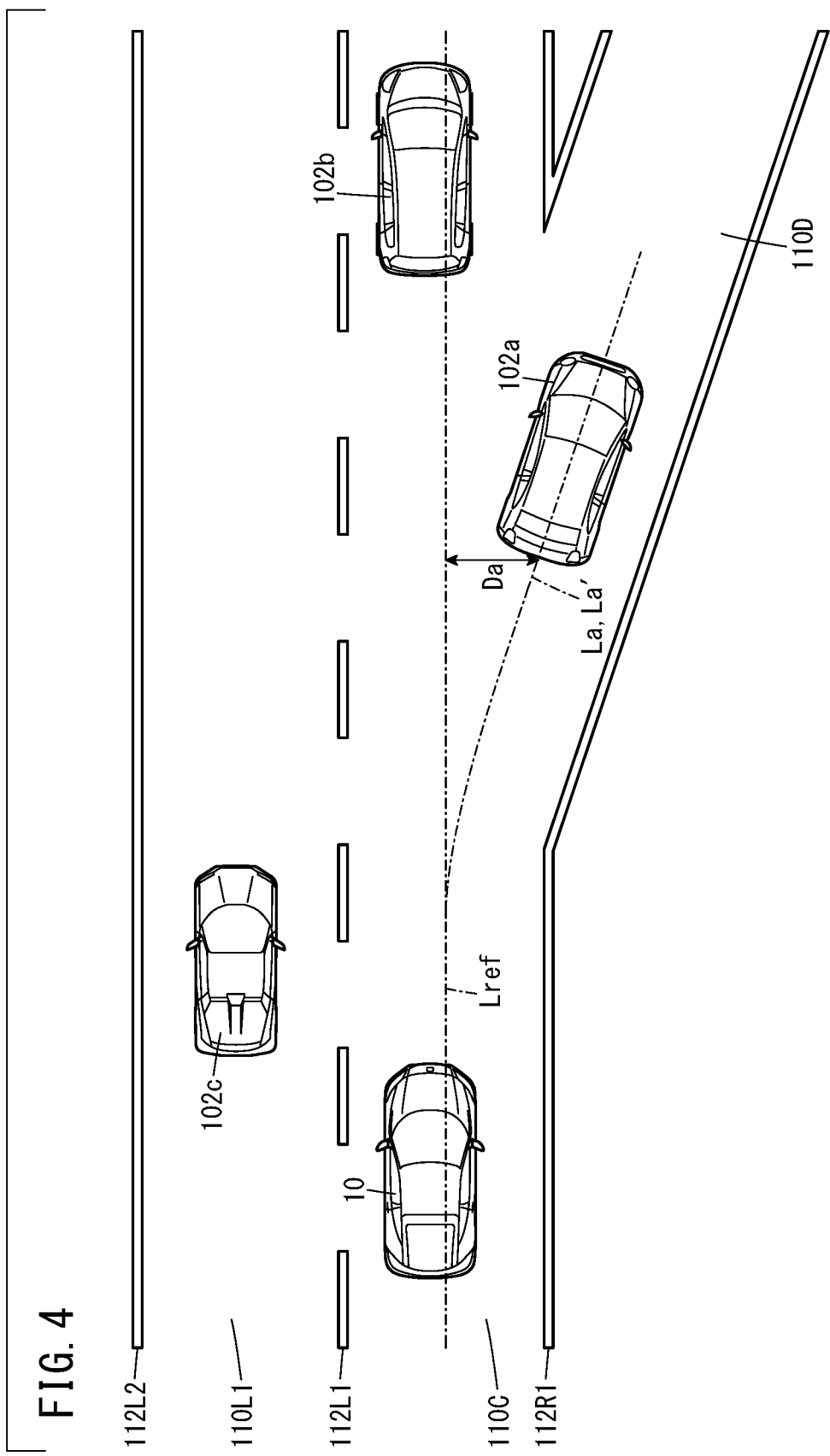
FIG. 4 is a diagram showing an example of a situation in which a preceding vehicle is in the middle of traveling toward a branching path.

FIG. 4 is a diagram showing an example of a situation in which a preceding vehicle is in the middle of traveling toward a branching path. In the case that the preceding vehicle 102a is in the middle of traveling toward a branching path (branching lane) 110D, the first distance Da between the position Lref of the host vehicle lane 110C and the position La' corresponding to the position La of the preceding vehicle 102a is greater than or equal to the threshold value.

In the case that the first distance Da between the position Lref of the host vehicle lane 110C and the position La' corresponding to the position La of the preceding vehicle 102a is greater than or equal to the threshold value, the determination unit 76 performs the following process. The determination unit 76 determines, for example, whether or not the first distance Db between the position Lref of the host vehicle lane 110C and the position Lb' corresponding to the position Lb of the further preceding vehicle 102b is less than the threshold value. In the case that the first distance Db between the position Lref of the host vehicle lane 110C and the position Lb' corresponding to the position Lb of the further preceding vehicle 102b is less than the threshold value, the determination unit 76 performs the following process. More specifically, in such a case, the determination unit 76 determines that the position Lref of the host vehicle lane 110C is being correctly detected. In the case it is determined that the position Lref of the host vehicle lane 110C is being correctly detected, the travel assist unit 64 controls the host vehicle 10 so as to travel in the lane 110C recognized by the lane recognition unit 62.

In the case that the further preceding vehicle 102b does not exist, the determination unit 76 performs the following process. Further, also in the case that the first distance Db between the position Lref of the host vehicle lane 110C and the position Lb' corresponding to the position Lb of the further preceding vehicle 102b is greater than or equal to the threshold value, the determination unit 76 performs the following process. More specifically, the determination unit 76 determines whether or not the first distances D in relation to the other vehicles 102 traveling in the adjacent lanes 110L1 and 110R1 are less than the threshold value. In the case that other vehicles 102 for which the first distances D are less than the threshold value are traveling in the adjacent lanes 110L1 and 110R1, the determination unit 76 determines that the position Lref of the host vehicle lane 110C is being correctly detected. In the case it is determined that the position Lref of the host vehicle lane 110C is being correctly detected, the travel assist unit 64 controls the host vehicle 10 so as to travel in the lane 110C recognized by the lane recognition unit 62.

Figure 5:
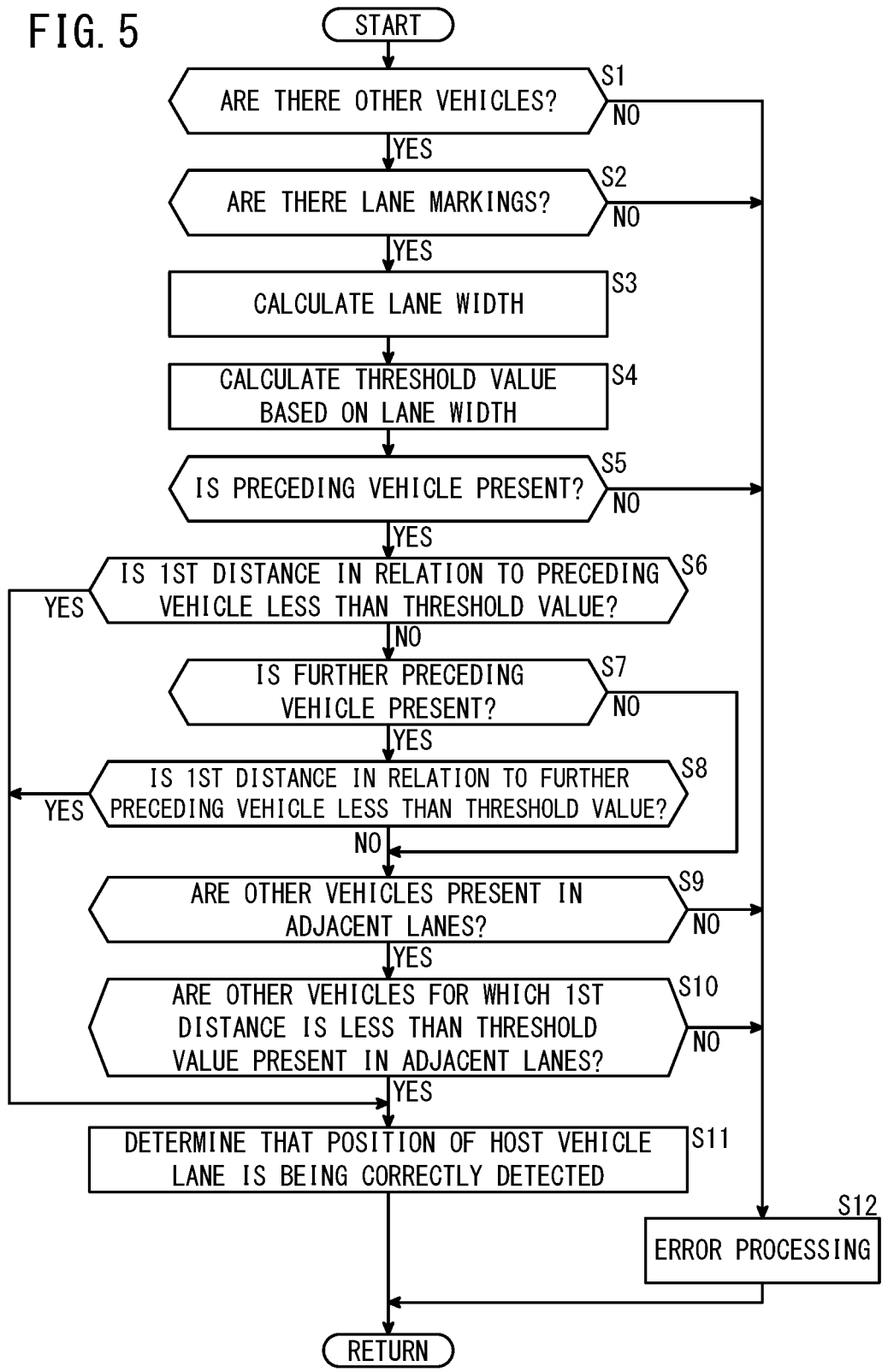
FIG. 5 is a flowchart illustrating an example of operations of the vehicle control device according to the embodiment.

FIG. 5 is a flowchart illustrating an example of operations of the vehicle control device according to the present embodiment. In step S1, a determination is made as to whether or not the other vehicles 102 exist. The radar information processing unit 72 determines whether or not the other vehicles 102 exist on the basis of the radar information Sr. The camera information processing unit 70 determines whether or not the other vehicles 102 exist on the basis of the camera information Sc. Based on the camera information Sc and the radar information Sr, it is determined whether or not the other vehicles 102 exist. Moreover, the presence or absence of the other vehicles 102 may be determined on the basis of either one of the camera information Sc and the radar information Sr. If it is determined that the other vehicles 102 exist (YES in step S1), the process proceeds to step S2. If it is determined that the other vehicles 102 do not exist (NO in step S1), the process proceeds to step S12.

In step S2, the camera information processing unit 74 detects the lane markings 112 on the basis of the camera information Sc. In the case that the left and right lane markings 112L1 and 112R1 exist (YES in step S2), the process proceeds to step S3. In the case that only one from among the left and right lane markings 112L1 and 112R1 exists (NO in step S2), the process proceeds to step S12. In the case that both of the left and right lane markings 112L1 and 112R1 do not exist (NO in step S2), the process proceeds to step S12.

In step S3, the lane recognition unit 62 calculates the distance between the left and right lane markings 112L1 and 112R1, or in other words, the lane width WL (see FIG. 2). For example, a distance between the lane markings 112L1 and 112R1 in a predetermined area in front of the host vehicle 10 is taken as the lane width WL. Thereafter, the process proceeds to step S4.

In step S4, the lane recognition unit 62 calculates the threshold value on the basis of the lane width WL. Thereafter, the process proceeds to step S5.

In step S5, the other vehicle recognition unit 60 determines whether or not the preceding vehicle 102a exists. If it is determined that the preceding vehicle 102a exists (YES in step S5), the process proceeds to step S6. If it is determined that the preceding vehicle 102a does not exist (NO in step S5), the process proceeds to step S12.

In step S6, the determination unit 76 performs the following process. More specifically, the determination unit 76 determines whether or not the first distance Da, which is the distance in the lane widthwise direction between the position Lref of the host vehicle lane 110C and the position La' corresponding to the position La of the preceding vehicle 102a, is less than the threshold value. In such a manner, the determination unit 76 determines whether or not the first distance Da in relation to the preceding vehicle 102a is less than the threshold value. If the first distance Da in relation to the preceding vehicle 102a is less than the threshold value (YES in step S6), the process proceeds to step S11. If the first distance Da in relation to the preceding vehicle 102a is greater than or equal to the threshold value (NO in step S6), the process proceeds to step S7.

In step S7, the other vehicle recognition unit 60 determines whether or not the further preceding vehicle 102b exists. If it is determined that the further preceding vehicle 102b exists (YES in step S7), the process proceeds to step S8. If it is determined that the further preceding vehicle 102b does not exist (NO in step S7), the process proceeds to step S9.

In step S8, the determination unit 76 performs the following process. More specifically, the determination unit 76 determines whether or not the first distance Db, which is the distance in the lane widthwise direction between the position Lref of the host vehicle lane 110C and the position Lb' corresponding to the position Lb of the further preceding vehicle 102b, is less than the threshold value. In such a manner, the determination unit 76 determines whether or not the first distance Db in relation to the further preceding vehicle 102b is less than the threshold value. If the first distance Db in relation to the further preceding vehicle 102b is less than the threshold value (YES in step S8), the process proceeds to step S11. If the first distance Db in relation to the further preceding vehicle 102b is greater than or equal to the threshold value (NO in step S8), the process proceeds to step S9.

In step S9, the other vehicle recognition unit 60 determines whether or not the other vehicles 102 exist in the adjacent lanes 110L1 and 110R1. In the case that the other vehicles 102 exist in the adjacent lanes 110L1 and 110R1 (YES in step S9), the process proceeds to step S10. In the case that the other vehicles 102 do not exist in the adjacent lanes 110L1 and 110R1 (NO in step S9), the process proceeds to step S12.

In step S10, the determination unit 76 determines whether or not other vehicles 102 for which the first distances D are less than the threshold value exist in the adjacent lanes 110L1 and 110R1. In the case that other vehicles 102 for which the first distances D are less than the threshold value exist in the adjacent lanes 110L1 and 110R1 (YES in step S10), the process proceeds to step S11. In the case that other vehicles 102 for which the first distances D are less than the threshold value do not exist in the adjacent lanes 110L1 and 110R1 (NO in step S10), the process proceeds to step S12.

In step S11, the determination unit 76 determines that the position Lref of the host vehicle lane 110C is being correctly detected. In the case it is determined that the position Lref of the host vehicle lane 110C is being correctly detected, the travel assist unit 64 performs the following process. More specifically, in such a case, the travel assist unit 64 carries out a control in a manner so that the host vehicle 10 travels in the lane 110C recognized by the lane recognition unit 62. Operations of the vehicle 10 are controlled on the basis of the lane markings 112L1 and 112R1 recognized by the lane recognition unit 62. More specifically, the travel assist unit 64 executes the LKAS control and the RDM control. In the LKAS control, for example, steering operations are assisted in a manner so that the host vehicle 10 travels in the center of the lane 110C and the driving load is reduced. In the LKAS control, the travel assist unit 64 outputs steering angle commands with respect to the EPS ECU 34 in a manner so that, for example, the host vehicle 10 travels in the center of the lanes 110. The LKAS control may be used in combination with the aforementioned automatic cruise control. In the RDM control, when the host vehicle 10 is about to depart from or has deviated from the lane 110C, the host vehicle 10 is prevented from departing from the lane 110C by controlling braking and steering. During the RDM control, the travel assist unit 64 outputs braking instructions with respect to the braking ECU 32 together with outputting steering angle instructions with respect to the EPS ECU 34, in order to prevent the host vehicle 10 from departing from the lane 110C.

In step S12, the computation unit 52 executes an error process. In this case, by the travel assist unit 64, a travel assist is carried out on the premise that the position Lref of the host vehicle lane 110C is not being correctly detected. Upon doing so, the process shown in FIG. 5 is brought to an end.

In the foregoing manner, according to the present embodiment, a determination is made on the basis of the positions L of the plurality of other vehicles 102 whether or not the position Lref of the host vehicle lane 110C is being correctly detected. More specifically, the host vehicle 10 is controlled by determining that the position Lref of the host vehicle lane 110C is being correctly detected on the basis of the other vehicles 102 existing among the plurality of other vehicles 102 for which the first distances D are less than the threshold value. In the case that the preceding vehicle 102a is in the middle of making a lane change, the first distance D in relation to the preceding vehicle 102a is greater than or equal to the threshold value. Further, in the case that the preceding vehicle 102a is traveling toward a branching path, the first distance D with respect to the preceding vehicle 102a is greater than or equal to the threshold value. In such cases as well, according to the present embodiment, a determination is made that the position Lref of the host vehicle lane 110C is being correctly detected, on the basis of the other vehicles 102 existing among the plurality of other vehicles 102 for which the first distances D are less than the threshold value. Therefore, according to the present embodiment, traveling of the host vehicle 10 can be controlled in a suitable manner, even in the case that the preceding vehicle 102a is in the middle of making a lane change or is traveling toward a branching path.

Modification 1

Figure 6:
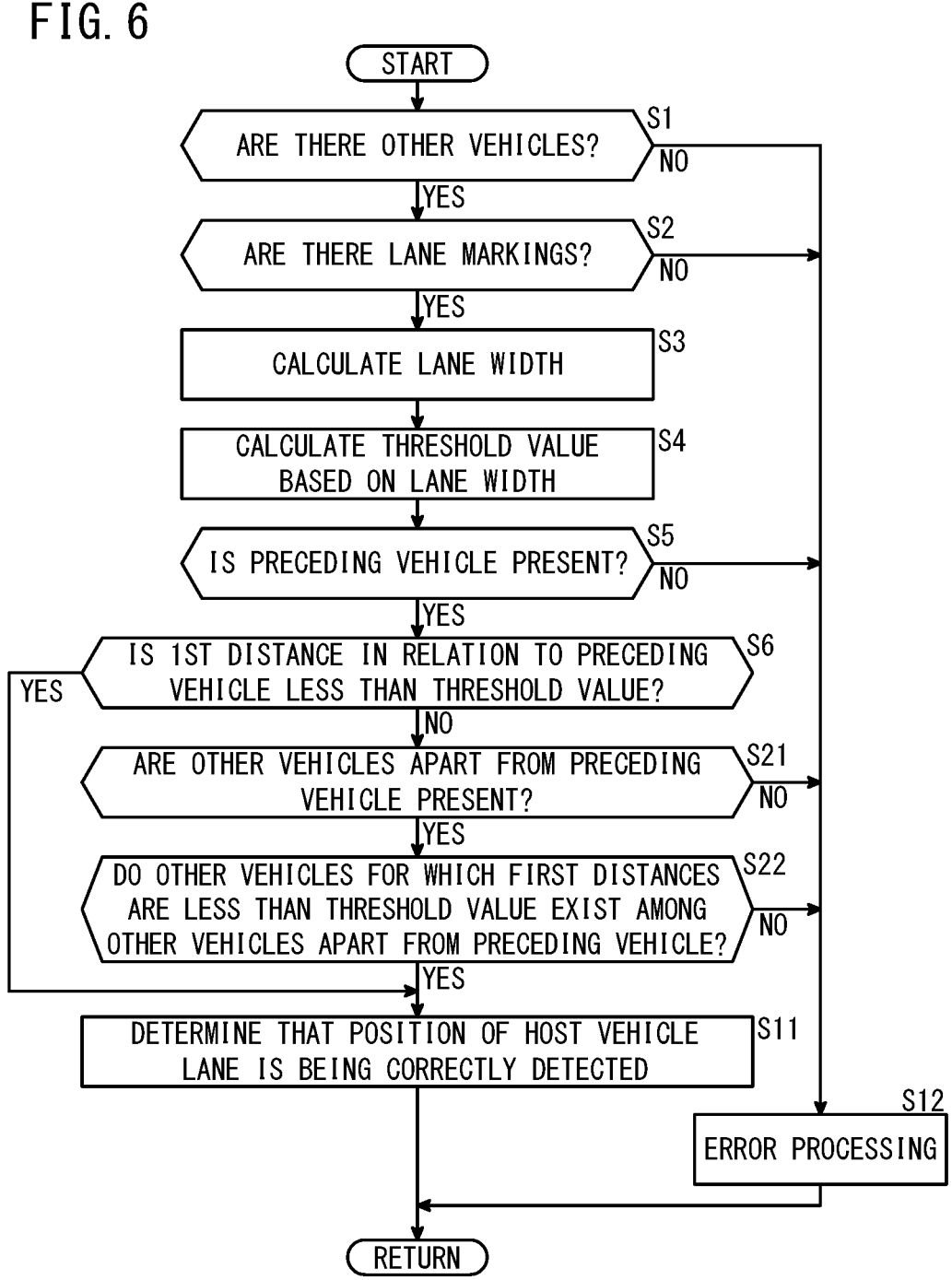
FIG. 6 is a flowchart illustrating an example of operations of the vehicle control device according to a first modification of the embodiment.

A vehicle control device, a vehicle control method, and a non-transitory computer-readable medium storing a program according to a first modification of the present embodiment will be described with reference to FIG. 6. FIG. 6 is a flowchart illustrating an example of operations of the vehicle control device according to the present modification.

Steps S1 to S6 are the same as steps S1 to S6 described above with reference to FIG. 5, and therefore description of these steps is omitted. If the first distance Da in relation to the preceding vehicle 102a is less than the threshold value (YES in step S6), the process proceeds to step S11. If the first distance Da in relation to the preceding vehicle 102a is greater than or equal to the threshold value (NO in step S6), the process proceeds to step S21.

In step S21, the other vehicle recognition unit 60 determines whether or not other vehicles 102 are present apart from the preceding vehicle 102a. If it is determined that there are other vehicles 102 existing apart from the preceding vehicle 102a (YES in step S21), the process proceeds to step S22. If it is determined that there are no other vehicles 102 existing apart from the preceding vehicle 102a (NO in step S21), the process proceeds to step S12.

In step S22, the determination unit 76 determines whether or not other vehicles 102 for which the first distances D are less than the threshold value exist among the other vehicles 102 apart from the preceding vehicle 102a. In the case that other vehicles 102 for which the first distances D are less than the threshold value exist among the other vehicles 102 apart from the preceding vehicle 102a (YES in step S22), the process proceeds to step S11. In the case that other vehicles 102 for which the first distances D are less than the threshold value do not exist among the other vehicles 102 apart from the preceding vehicle 102a (NO in step S22), the process proceeds to step S12.

Steps S11 to S12 are the same as steps S11 to S12 described above with reference to FIG. 5, and therefore description of these steps is omitted. Upon completion of the above steps, the process shown in FIG. 6 is brought to an end.

In the foregoing manner, in the case that other vehicles 102 for which the first distances D are less than the threshold value exist among the other vehicles 102 apart from the preceding vehicle 102a, it may be determined that the position Lref of the host vehicle lane 110C is being correctly detected. According to the present modification as well, traveling of the host vehicle 10 can be controlled in a suitable manner.

Modification 2

Figure 7:
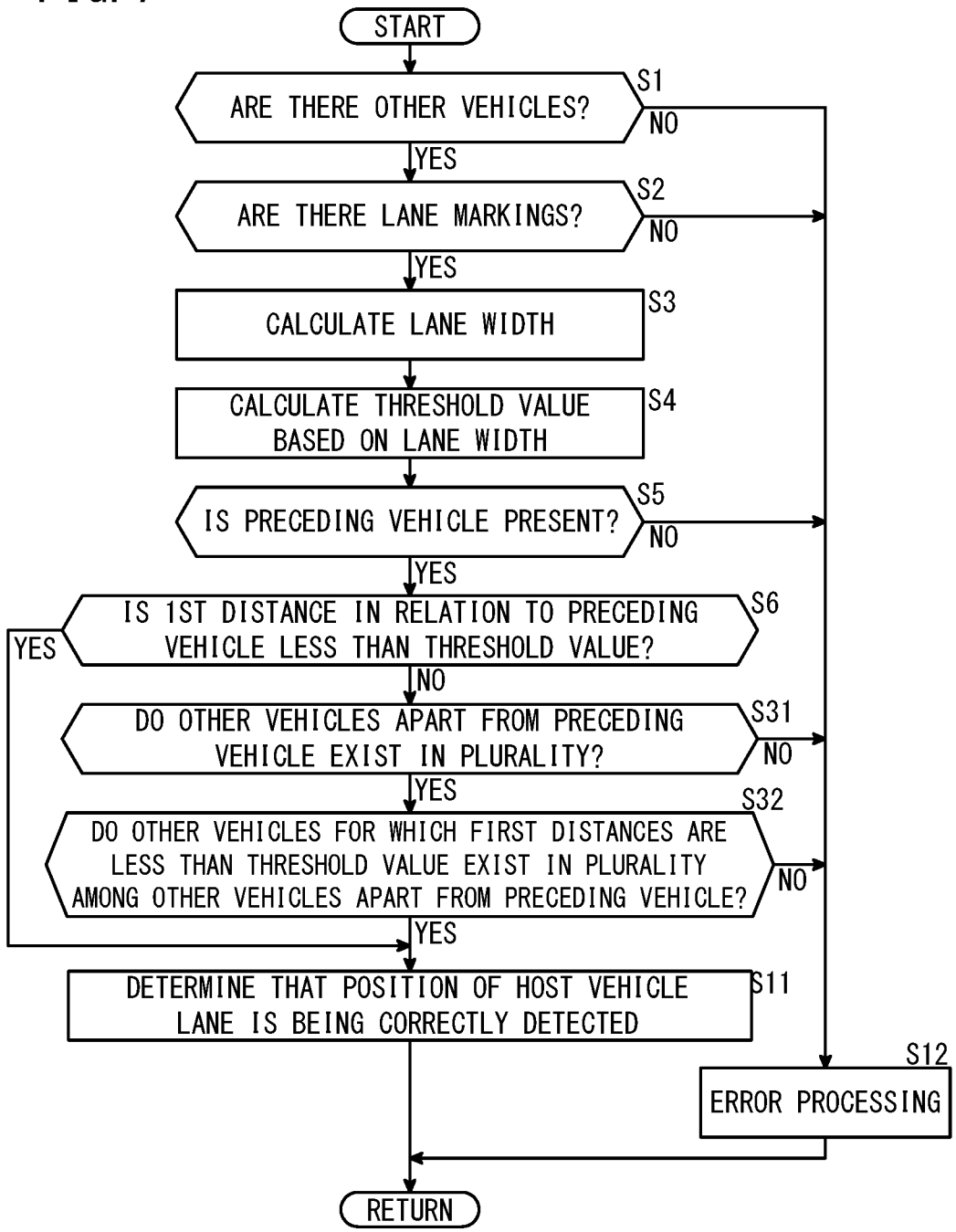
FIG. 7 is a flowchart illustrating an example of operations of the vehicle control device according to a second modification of the embodiment.

A vehicle control device, a vehicle control method, and a non-transitory computer-readable medium storing a program according to a second modification of the present embodiment will be described with reference to FIG. 7. FIG. 7 is a flowchart illustrating an example of operations of the vehicle control device according to the present modification.

Steps S1 to S6 are the same as steps S1 to S6 described above with reference to FIG. 5, and therefore description of these steps is omitted. If the first distance Da in relation to the preceding vehicle 102a is less than the threshold value (YES in step S6), the process proceeds to step S11. If the first distance Da in relation to the preceding vehicle 102a is greater than or equal to the threshold value (NO in step S6), the process proceeds to step S31.

In step S31, the other vehicle recognition unit 60 determines whether or not other vehicles 102 exist in plurality apart from the preceding vehicle 102a. If it is determined that other vehicles 102 exist in plurality apart from the preceding vehicle 102a (YES in step S31), the process proceeds to step S32. If it is determined that other vehicles 102 do not exist in plurality apart from the preceding vehicle 102a (NO in step S31), the process proceeds to step S12.

In step S32, the determination unit 76 determines whether or not other vehicles 102 for which the first distances D are less than the threshold value exist in plurality among the other vehicles 102 apart from the preceding vehicle 102a. In the case that other vehicles 102 for which the first distances D are less than the threshold value exist in plurality among the other vehicles 102 apart from the preceding vehicle 102a (YES in step S32), the process proceeds to step S11. In the case that other vehicles 102 for which the first distances D are less than the threshold value do not exist in plurality among the other vehicles 102 apart from the preceding vehicle 102a (NO in step S32), the process proceeds to step S12.

Steps S11 to S12 are the same as steps S11 to S12 described above with reference to FIG. 5, and therefore description of these steps is omitted. Upon completion of the above steps, the process shown in FIG. 7 is brought to an end.

In the foregoing manner, in the case that other vehicles 102 for which the first distances D are less than the threshold value exist in plurality among the other vehicles 102 apart from the preceding vehicle 102a, it may be determined that the position Lref of the host vehicle lane 110C is being correctly detected. According to the present modification as well, traveling of the host vehicle 10 can be controlled in a suitable manner.

Modification 3

Figure 8:
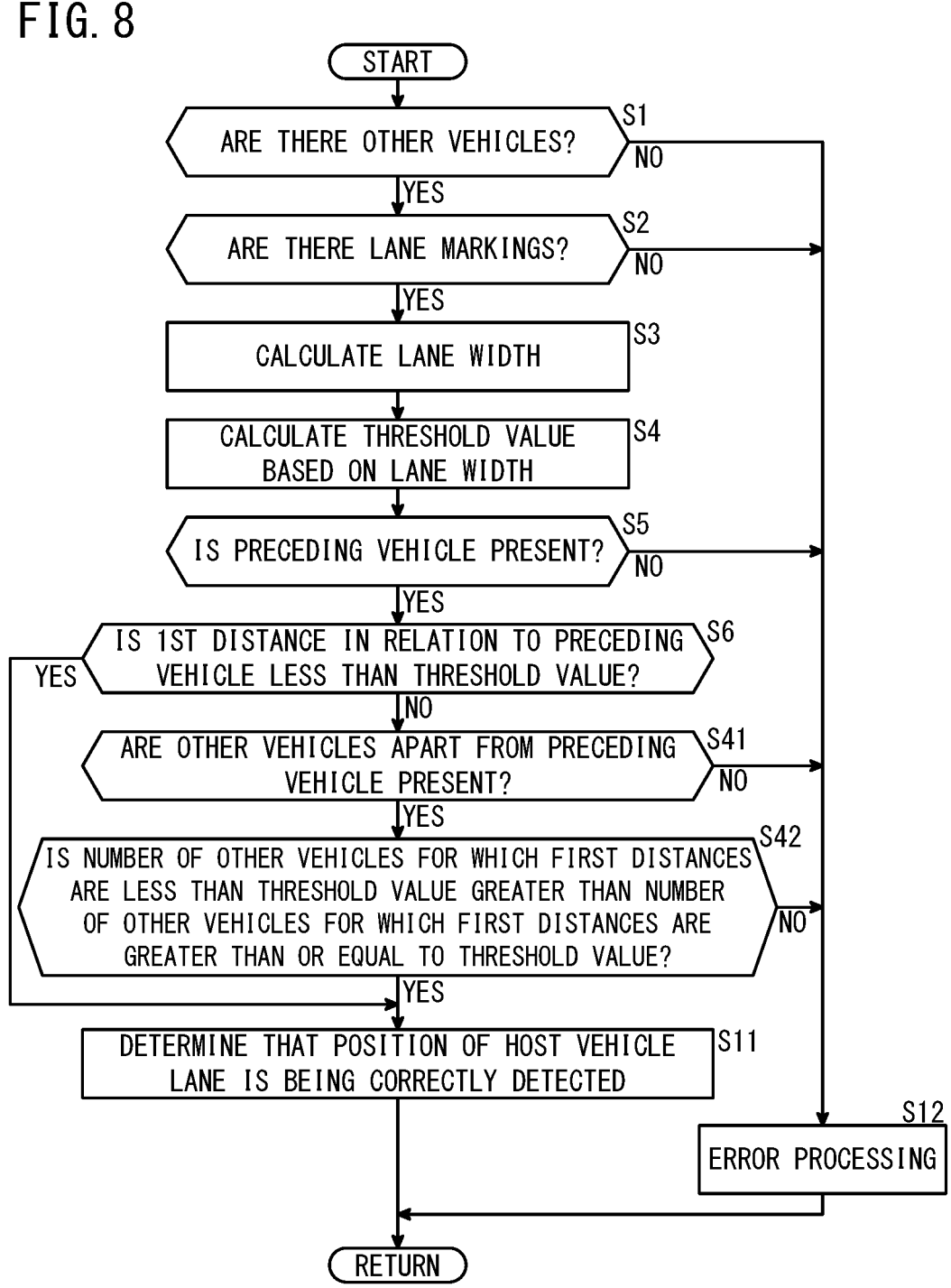
FIG. 8 is a flowchart illustrating an example of operations of the vehicle control device according to a third modification of the embodiment.

A vehicle control device, a vehicle control method, and a non-transitory computer-readable medium storing a program according to a third modification of the present embodiment will be described with reference to FIG. 8. FIG. 8 is a flowchart illustrating an example of operations of the vehicle control device according to the present modification.

Steps S1 to S6 are the same as steps S1 to S6 described above with reference to FIG. 5, and therefore description of these steps is omitted. If the first distance Da in relation to the preceding vehicle 102a is less than the threshold value (YES in step S6), the process proceeds to step S11. If the first distance Da in relation to the preceding vehicle 102a is greater than or equal to the threshold value (NO in step S6), the process proceeds to step S41.

In step S41, the other vehicle recognition unit 60 determines whether or not other vehicles 102 are present apart from the preceding vehicle 102a. If it is determined that there are other vehicles 102 existing apart from the preceding vehicle 102a (YES in step S41), the process proceeds to step S42. If it is determined that there are no other vehicles 102 existing apart from the preceding vehicle 102a (NO in step S41), the process proceeds to step S12.

In step S42, the determination unit 76 determines whether the number of other vehicles 102 for which the first distances D are less than the threshold value is greater than the number of other vehicles 102 for which the first distances D are greater than or equal to the threshold value. If the number of other vehicles 102 for which the first distances D are less than the threshold value is greater than the number of other vehicles 102 for which the first distances D are greater than or equal to the threshold value (YES in step S42), the process proceeds to step S11. If the number of other vehicles 102 for which the first distances D are less than the threshold value is less than or equal to the number of other vehicles 102 for which the first distances D are greater than or equal to the threshold value (NO in step S42), the process proceeds to step S12.

Steps S11 to S12 are the same as steps S11 to S12 described above with reference to FIG. 5, and therefore description of these steps is omitted. Upon completion of the above steps, the process shown in FIG. 8 is brought to an end.

In the foregoing manner, in the case that the number of other vehicles 102 for which the first distances D are less than the threshold value is greater than the number of other vehicles 102 for which the first distances D are greater than or equal to the threshold value, it may be determined that the position Lref of the host vehicle lane 110C is being correctly detected. According to the present modification as well, traveling of the host vehicle 10 can be controlled in a suitable manner.

Modified Embodiments

The present invention is not limited to the embodiment described above, and various modifications are possible.

For example, in the above-described embodiment, whether or not the first distances D are less than the threshold value are each determined individually, however, the present invention is not limited to this feature. A determination may be made as to whether or not an average value of the plurality of first distances D is less than the threshold value. For example, when the first distance Da in relation to the preceding vehicle 102a is greater than or equal to the threshold value, and in the case that other vehicles 102b to 102e apart from the preceding vehicle 102a are detected, the following process is performed. More specifically, it is determined whether the average value of the first distances Db to De in relation to each of the other vehicles 102b to 102e is less than the threshold value. In addition, in the case that the average value of the first distances Db to De is less than the threshold value, it may be determined that other vehicles 102 exist for which the first distances D are less than the threshold value. On the other hand, in the case that the average value of the first distances Db to De is greater than or equal to the threshold value, it may be determined that other vehicles 102 do not exist for which the first distances D are less than the threshold value.

Further, in the above-described embodiment, although white lines (solid lines and broken lines) of the road were assumed as making up the lane markings 112, the present invention is not limited to this feature. For example, the lane markings 112 may comprise any of yellow lines, Botts' dots, cat's eyes, or the like. Further, the lane markings 112 may be guard rails. Further, the lane markings 112 may be virtual markings arranged at a position separated by a predetermined distance from the guard rails.

Further, in the above-described embodiment, the positions L of the other vehicles 102 are shifted by an amount of shifting corresponding to the positions of the other vehicles 102, thereby obtaining the positions L' in accordance with the positions L of the other vehicles 102. In addition, a determination is made as to whether or not the first distance D between the position Lref of the host vehicle lane 110C and the position L' corresponding to the position L of the preceding vehicle 102 is less than the threshold value. However, the process for determining whether or not other vehicles 102 are present for which the first distances D are less than the threshold value is not limited to such a process. For example, a threshold value in accordance with the positions of the other vehicles 102 may be used. Stated otherwise, the threshold value may be corrected in accordance with the positions of the other vehicles 102. More specifically, for example, in the case that the other vehicles 102 are located in the adjacent lanes 110R1 and 110L1, a value corresponding to the width WL of one lane may be added to the threshold value. In addition, in the case that the distances between the positions L of the other vehicles 102 and the position Lref of the host vehicle lane 110C lie within a range of the threshold value, it may be determined that the other vehicles 102 are other vehicles for which the first distances D are less than the threshold value.

Further, in the above-described embodiment, a description has been given of a case in which a determination is made as to whether or not other vehicles 102 exist for which the first distances D are less than the threshold value, on the basis of whether or not the first distances D are less than the threshold value, however, the present invention is not limited to this feature. For example, it may be determined that the other vehicles 102 are other vehicles for which the first distances D are less than the threshold value, based on an angle formed by the center lines of the lanes 110 in which the other vehicles 102 are traveling, and the travel trajectories of the other vehicles 102. For example, in the case that the angle formed by the center lines of the lanes 110 in which the other vehicles 102 are traveling and the travel trajectories of the other vehicles 102 is less than the threshold value, it may be determined that the other vehicles 102 are other vehicles for which the first distances D are less than the threshold value. On the other hand, in the case that the angle formed by the center lines of the lanes 110 in which the other vehicles 102 are traveling and the travel trajectories of the other vehicles 102 is greater than or equal to the threshold value, it may be determined that the other vehicles 102 are other vehicles for which the first distances D are greater than or equal to the threshold value. Further, it may be determined whether or not other vehicles 102 exist for which the first distances D are less than the threshold value based on the velocities of the other vehicles 102 in the lane widthwise direction. For example, other vehicles 102 for which the velocities in the lane widthwise direction are less than a predetermined value (threshold value) may be determined to be other vehicles for which the first distances D are less than the threshold value. On the other hand, other vehicles 102 for which the velocities in the lane widthwise direction are greater than or equal to the predetermined value (threshold value) may be determined to be other vehicles for which the first distances D are greater than or equal to the threshold value. In other words, a determination may be made as to whether or not the other vehicles 102 are other vehicles for which the first distances D are greater than or equal to the threshold value, on the basis of a time-series change in position obtained from the travel trajectories of the other vehicles 102.

Summarizing the above-described embodiment and modifications thereof, the characteristic features described below are realized.

The vehicle control device (44) includes the detection unit (60, 62) configured to detect the positions of the lanes (110) and the position (L) of another vehicle (102) on the basis of peripheral information, and the control unit (64) configured to determine, on the basis of the positions of a plurality of the other vehicles (102), whether or not the position (Lref) of the host vehicle lane (110C), which is the lane in which the host vehicle (10) is traveling, is being correctly detected by the detection unit (60, 62), and to control the host vehicle (10) by determining that the position (Lref) of the host vehicle lane (110C) is being correctly detected by the detection unit (60, 62), on the basis of the other vehicle (102) existing among the plurality of other vehicles (102), for which the first distance (D), which is a distance in a lane widthwise direction between the position of the host vehicle lane (110C) and the position (L') corresponding to the position of the other vehicle (102), is less than the threshold value. In accordance with such a configuration, whether the position (Lref) of the host vehicle lane (110C) is being correctly detected by the detection unit (60, 62) is determined on the basis of the positions (L) of the plurality of other vehicles (102). In accordance with such a configuration, the position (Lref) of the host vehicle lane (110C) can be detected in a suitable manner, and traveling of the host vehicle (10) can be suitably controlled.

The position (L') corresponding to the position (L) of the other vehicle (102) may be a position obtained by shifting the position (L) of the other vehicle (102) from the position (Lref) of the lane (110) in which the other vehicle (102) is traveling toward the position of the host vehicle lane (110C), by a distance in the lane widthwise direction between the position (Lref) of the host vehicle lane (110C) and the position of the lane (110) in which the other vehicle (102) is traveling. In accordance with such a configuration, whether or not the position (Lref) of the host vehicle lane (110C) is being correctly detected by the detection unit (60, 62) is suitably determined. Therefore, in accordance with such a configuration, traveling of the host vehicle (10) can be controlled in a suitable manner.

The travel trajectory (L) of the other vehicle (102) for which the first distance (D) is less than the threshold value may be parallel with the travel trajectory (Lm) of the host vehicle (10).

Even if another vehicle (102) for which the first distance (D) is greater than or equal to the threshold value exists among the plurality of other vehicles (102), in the case that the other vehicle (102) for which the first distance (D) is less than the threshold value exists among the plurality of other vehicles (102), the control unit (64) may control the host vehicle (10) by determining that the position (Lref) of the host vehicle lane (110C) is being correctly detected by the detection unit (60, 62). In accordance with such a configuration, even if other vehicles (102) for which the first distance (D) is greater than or equal to the threshold value exist among the plurality of other vehicles (102), the position (Lref) of the host vehicle lane (110C) can be suitably detected. Therefore, in accordance with such a configuration, traveling of the host vehicle (10) can be controlled in a suitable manner.

Even if the other vehicle (102) for which the first distance (D) is greater than or equal to the threshold value is a preceding vehicle (102a), in the case that the other vehicle (102) for which the first distance (D) is less than the threshold value exists among the plurality of other vehicles (102), the control unit (64) may control the host vehicle (10) by determining that the position (Lref) of the host vehicle lane (110C) is being correctly detected by the detection unit (60, 62). In accordance with such a configuration, even in the case that the preceding vehicle (102a) is in the middle of making a lane change or the like, traveling of the host vehicle (10) can be suitably controlled. In accordance with such a configuration, even in the case that the preceding vehicle (102a) is in the middle of making a lane change or the like, the position (Lref) of the host vehicle lane (110C) can be suitably detected. Therefore, in accordance with such a configuration, traveling of the host vehicle (10) can be controlled in a suitable manner.

The other vehicle (102) for which the first distance (D) is less than the threshold value is a further preceding vehicle (102b). In accordance with such a configuration, even in the case that the preceding vehicle (102a) is in the middle of making a lane change or the like, the position (Lref) of the host vehicle lane (110C) can be suitably detected. Therefore, in accordance with such a configuration, traveling of the host vehicle (10) can be controlled in a suitable manner.

The other vehicle (102) for which the first distance (D) is less than the threshold value may be another vehicle (102) that is traveling in a lane (110L1 and 110R1) adjacent to the host vehicle lane (110C). In accordance with such a configuration, even in the case that not only the preceding vehicle (102a) but also the further preceding vehicle (102b) are in the middle of making a lane change or the like, the position (Lref) of the host vehicle lane (110C) can be suitably detected. Therefore, in accordance with such a configuration, traveling of the host vehicle (10) can be controlled in a suitable manner.

The other vehicle (102) for which the first distance (D) is greater than or equal to the threshold value may be another vehicle (102) that is in the middle of making a lane change. In accordance with such a configuration, even in the case that the other vehicle (102) is in the middle of making a lane change, the position (Lref) of the host vehicle lane (110C) can be suitably detected. Therefore, in accordance with such a configuration, traveling of the host vehicle (10) can be controlled in a suitable manner.

The other vehicle (102) for which the first distance (D) is greater than or equal to the threshold value may be another vehicle (102) that is in the middle of traveling toward a branching path (110D). In accordance with such a configuration, even in the case that the other vehicle (102) is in the middle of traveling toward a branching path (110D), the position (Lref) of the host vehicle lane (110C) can be suitably detected. Therefore, in accordance with such a configuration, traveling of the host vehicle (10) can be controlled in a suitable manner.

In the case that the other vehicles (102) for which the first distance (D) is less than the threshold value exist in plurality, the control unit (64) may control the host vehicle (10) by determining that the position (Lref) of the host vehicle lane (110C) is being correctly detected by the detection unit (60, 62). In accordance with such a configuration, it is possible to improve the reliability of the determination as to whether or not the position (Lref) of the host vehicle lane (110C) is being correctly detected. Therefore, in accordance with such a configuration, traveling of the host vehicle (10) can be controlled in a more suitable manner.

In the case that the number of other vehicles (102) for which the first distances (D) are less than the threshold value exceeds the number of other vehicles (102) for which the first distances (D) are greater than or equal to the threshold value, the control unit (64) may control the host vehicle (10) by determining that the position (Lref) of the host vehicle lane (110C) is being correctly detected by the detection unit (60, 62). In accordance with such a configuration, it is possible to improve the reliability of the determination as to whether or not the position (Lref) of the host vehicle lane (110C) is being correctly detected. Therefore, in accordance with such a configuration, traveling of the host vehicle (10) can be controlled in a more suitable manner.

The vehicle control method comprises the step (S1, S2) of detecting the position of the lane (110) and the position of another vehicle (102) on the basis of peripheral information, and the step (S11) of controlling, which is a step (S11) of determining, on the basis of the positions (L) of a plurality of the other vehicles (102), whether or not the position (Lref) of the host vehicle lane (110C), which is the lane in which the host vehicle (10) is traveling, is being correctly detected, and controlling the host vehicle (10) by determining that the position (Lref) of the host vehicle lane (110C) is being correctly detected, on the basis of the other vehicle (102) existing among the plurality of other vehicles (102), for which the first distance (D), which is a distance in a lane widthwise direction between the position (Lref) of the host vehicle lane (110C) and a position (L') corresponding to the position (L) of the other vehicle (102), is less than the threshold value.

The non-transitory computer-readable storage medium stores a program, wherein the program serves to execute, in a computer, the step (S1, S2) of detecting the position of the lane (110) and the position of another vehicle (102) on the basis of peripheral information, and the step (S11) of controlling, which is a step (S11) of determining, on the basis of the positions (L) of a plurality of the other vehicles (102), whether or not the position (Lref) of the host vehicle lane (110C), which is the lane in which the host vehicle (10) is traveling, is being correctly detected, and controlling the host vehicle (10) by determining that the position (Lref) of the host vehicle lane (110C) is being correctly detected, on the basis of the other vehicle (102) existing among the plurality of other vehicles (102), and for which the first distance (D), which is a distance in a lane widthwise direction between the position (Lref) of the host vehicle lane (110C) and a position (L') corresponding to the position (L) of the other vehicle (102), is less than a threshold value.

What is claimed is:

1. A vehicle control device, comprising a memory and one or more processors that execute computer-executable instructions stored in the memory, wherein the one or more processors execute the computer-executable instructions to cause the vehicle control device to:
    detect a position of a lane and a position of another vehicle on a basis of peripheral information; and
    determine, on a basis of the positions of a plurality of other vehicles, whether or not a position of a host vehicle lane, which is the lane in which a host vehicle is traveling, is being correctly detected, and control the host vehicle by determining that the position of the host vehicle lane is being correctly detected, on a basis of another vehicle existing among the plurality of other vehicles, for which a first distance, which is a distance in a lane widthwise direction between the position of the host vehicle lane and a position corresponding to the position of the other vehicle, is less than a threshold value.

2. The vehicle control device according to claim 1, wherein the position corresponding to the position of the other vehicle is a position obtained by shifting the position of the other vehicle from the position of the lane in which the other vehicle is traveling toward the position of the host vehicle lane, by a distance in the lane widthwise direction between the position of the host vehicle lane and the position of the lane in which the other vehicle is traveling.

3. The vehicle control device according to claim 1, wherein a travel trajectory of the other vehicle for which the first distance is less than the threshold value is parallel with a travel trajectory of the host vehicle.

4. The vehicle control device according to claim 1, wherein, even if another vehicle for which the first distance is greater than or equal to the threshold value exists among the plurality of other vehicles, in a case that the other vehicle for which the first distance is less than the threshold value exists among the plurality of other vehicles, the one or more processors execute the computer-executable instructions to cause the vehicle control device to determine that the position of the host vehicle lane is being correctly detected and control the host vehicle based on the determination.

5. The vehicle control device according to claim 4, wherein, even if the other vehicle for which the first distance is greater than or equal to the threshold value is a preceding vehicle, in a case that the other vehicle for which the first distance is less than the threshold value exists among the plurality of other vehicles, the one or more processors execute the computer-executable instructions to cause the vehicle control device to determine that the position of the host vehicle lane is being correctly detected and control the host vehicle based on the determination.

6. The vehicle control device according to claim 5, wherein the other vehicle for which the first distance is less than the threshold value is a leading vehicle traveling in front of the preceding vehicle.

7. The vehicle control device according to claim 5, wherein the other vehicle for which the first distance is less than the threshold value is another vehicle that is traveling in a lane adjacent to the host vehicle lane.

8. The vehicle control device according to claim 4, wherein the other vehicle for which the first distance is greater than or equal to the threshold value is another vehicle that is in the middle of making a lane change.

9. The vehicle control device according to claim 4, wherein the other vehicle for which the first distance is greater than or equal to the threshold value is another vehicle that is in the middle of traveling toward a branching path.

10. The vehicle control device according to claim 1, wherein, in a case that the other vehicles for which the first distance is less than the threshold value exist in plurality, the one or more processors execute the computer-executable instructions to cause the vehicle control device to determine that the position of the host vehicle lane is being correctly detected and controls the host vehicle based on the determination.

11. The vehicle control device according to claim 1, wherein, in a case that a number of the other vehicles for which the first distance is less than the threshold value exceeds a number of the other vehicles for which the first distance is greater than or equal to the threshold value, the one or more processors execute the computer-executable instructions to cause the vehicle control device to determine that the position of the host vehicle lane is being correctly detected and controls the host vehicle based on the determination.

12. A vehicle control method, comprising:
a step of detecting a position of a lane and a position of another vehicle on a basis of peripheral information; and
a step of determining, on a basis of the positions of a plurality of other vehicles, whether or not a position of a host vehicle lane, which is the lane in which a host vehicle is traveling, is being correctly detected, by determining that the position of the host vehicle lane is being correctly detected, on a basis of another vehicle existing among the plurality of other vehicles, for which a first distance, which is a distance in a lane widthwise direction between the position of the host vehicle lane and a position corresponding to the position of the other vehicle, is less than a threshold value;
and a step of controlling the host vehicle on a basis of determining that the position of the host vehicle lane is correctly detected.

13. A non-transitory computer-readable storage medium storing a program, wherein the program serves to execute in a computer:
a step of detecting a position of a lane and a position of another vehicle on a basis of peripheral information; and
a step of determining, on a basis of the positions of a plurality of other vehicles, whether or not a position of a host vehicle lane, which is the lane in which a host vehicle is traveling, is being correctly detected, by determining that the position of the host vehicle lane is being correctly detected, on a basis of another vehicle existing among the plurality of other vehicles, for which a first distance, which is a distance in a lane widthwise direction between the position of the host vehicle lane and a position corresponding to the position of the other vehicle, is less than a threshold value;
and a step of controlling the host vehicle on a basis of determining that the position of the host vehicle lane is correctly detected.

* * * * *